US007929536B2

United States Patent
Kumar et al.

(10) Patent No.: US 7,929,536 B2
(45) Date of Patent: Apr. 19, 2011

(54) BUFFER MANAGEMENT FOR COMMUNICATION PROTOCOLS

(75) Inventors: Alok Kumar, Santa Clara, CA (US); Eswar Eduri, Santa Clara, CA (US); Prashant R. Chandra, Santa Clara, CA (US); Uday R Naik, Fremont, CA (US)

(73) Assignee: Intel Corporation, Santa Clara, CA (US)

( * ) Notice: Subject to any disclaimer, the term of this patent is extended or adjusted under 35 U.S.C. 154(b) by 717 days.

(21) Appl. No.: 11/617,439

(22) Filed: Dec. 28, 2006

(65) Prior Publication Data

US 2008/0062991 A1 Mar. 13, 2008

Related U.S. Application Data

(60) Provisional application No. 60/824,861, filed on Sep. 7, 2006.

(51) Int. Cl.
*H04L 12/28* (2006.01)
*H04L 12/56* (2006.01)
(52) U.S. Cl. ....................................... 370/392
(58) Field of Classification Search ............ 370/392, 370/474
See application file for complete search history.

(56) References Cited

U.S. PATENT DOCUMENTS

| 5,734,825 | A  | * | 3/1998 | Lauck et al. ............ 709/233 |
| 2002/0126685 | A1 | * | 9/2002 | Leatherbury et al. ...... 370/432 |
| 2004/0013117 | A1 | * | 1/2004 | Hendel et al. ............ 370/394 |
| 2006/0268913 | A1 | * | 11/2006 | Singh et al. ............ 370/412 |

OTHER PUBLICATIONS

Shivam et al. Association of Computing Machinery (ACM) "EMP: Zero-copy OS-bypass NIC-driven Gigabit Ethernet Message Passing" Nov. 2001.*
"Transmission Control Protocol (TCP) Fundamentals and General Operation", Sep. 2005,Chapter 46 of The TCP/IP Guide, pp. 728-743.
Mansberg, Michael, "TCP/IP for Transactions", Embedded Systems Design, Jul. 1, 2002; 6 pages.

* cited by examiner

*Primary Examiner* — Daniel Wu
*Assistant Examiner* — Frederick Ott
(74) *Attorney, Agent, or Firm* — Grossman, Tucker, Perreault & Pfleger, PLLC

(57) ABSTRACT

A method according to one embodiment may include storing data in a send buffer. A transmission header may be created, in which the transmission header may include a pointer to the data in the send buffer. Packets may be transmitted, in which the packets include the transmission header and the data linked to the transmission header by the pointer, wherein the packets are transmitted without copying the data to create the packets. Of course, many alternatives, variations and modifications are possible without materially departing from this embodiment.

18 Claims, 4 Drawing Sheets

BUFFER MANAGEMENT FOR COMMUNICATION PROTOCOLS

CROSS-REFERENCE TO RELATED APPLICATIONS

This application claims the benefit of U.S. provisional patent application Ser. No. 60/824,861, filed Sep. 7, 2006, the entire disclosure of which is incorporated herein by reference.

FIELD

The present disclosure relates to data transmission systems and methods, and more particularly to TCP data transmission systems and methods.

BACKGROUND

Numerous communication protocols are employed for transmitting and receiving data between applications. Transmission Control Protocol (TCP) is an example of a data transfer protocol which may be used to reliably transmit data between applications. TCP may generally require a sender to buffer transmitted data until receipt of the data is acknowledged by the receiver. In addition to maintaining a copy of the transmitted data until receipt has been acknowledged, TCP also segments data to suit the path maximum segment size before transmission and may also retransmit data in case of a loss. Both segmentation and retransmission require an efficient mechanism to transmit data from any offset within the buffer. The data to be transmitted from the buffer may be of any size, limited by the maximum send window and maximum segment size. In order to perform the buffering and retransmission efficiently, it would be desirable to ensure zero-copy of data while sending the data out.

BRIEF DESCRIPTION OF THE DRAWINGS

Features and advantages of the present invention are set forth herein by the description of embodiments consistent therewith. The following description should be understood in conjunction with the accompanying drawings, wherein.

DESCRIPTION

Figure 1:
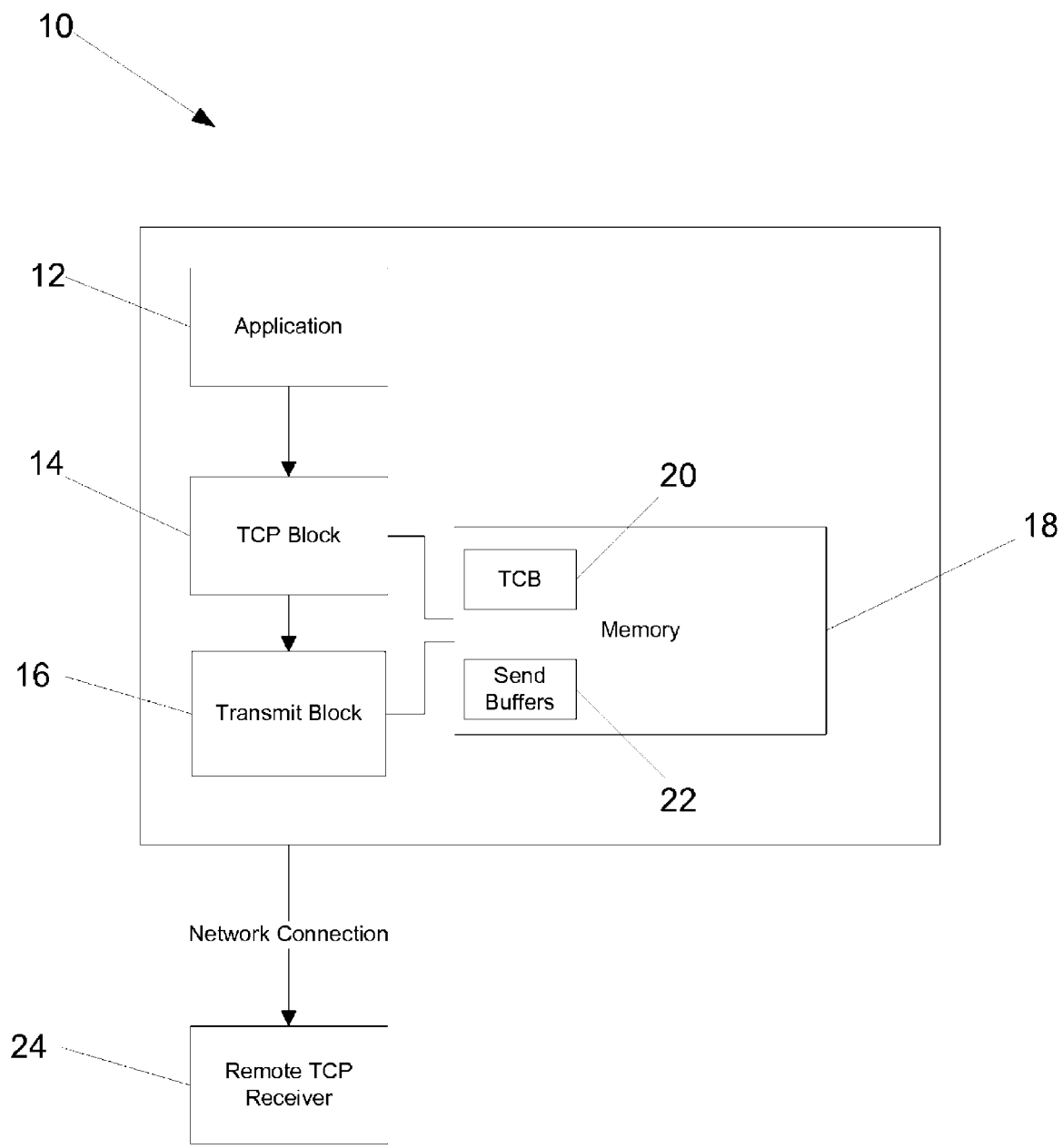
FIG. 1 is a block diagram of a system incorporating a data transmission system.

Referring to FIG. 1, a system 10 incorporating a data transmission system consistent with the present disclosure is shown. An application 12, running in the system 10, may have data to be sent to a remote receiver 24 over a network connection, etc. The application 12 may be any software running on the system 10 which is capable of communicating using transmission control protocol (TCP). TCP is defined by the Internet Engineering Task Force (IETF) standard 7, Request for Comment (RFC) 793, adopted September 1981 (TCP Specification). The system 10 may include a TCP block 14 implementing a TCP communication protocol for controlling the transmission of data from the application 12 to the remote TCP receiver 24, e.g., by way of a transmit block 16, which may transmit the data over the network connection. A send buffer 22 and TCP control block 20 may be maintained in a system memory 18.

Figure 2:
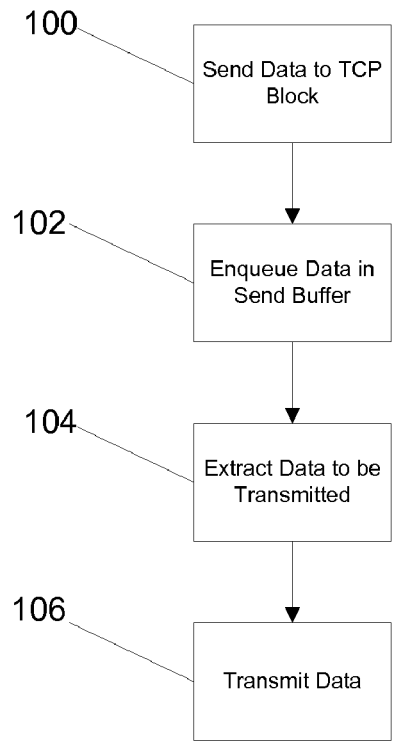
FIG. 2 is a block diagram of a data transmission.

TCP communication protocol may require that transmitted data be buffered until the data has been acknowledged as having been received by the remote TCP receiver 24. Maintaining the buffered data until receipt has been acknowledged may, among other things, allow the data to be retransmitted to the remote TCP receiver 24 in the event that all, or a portion of, the data is dropped in the network. The transmission system may provide an efficient way for data to be buffered until the data is acknowledged as received by a receiver. As mentioned above, the data may be buffered so that it may be retransmitted in case of loss. Buffering the data may also allow the data to be segmented for transmission according to maximum segment size of the path. Referring also to FIG. 2, generally send socket buffering may be handled by the TCP block 14. In such an instance the data buffering may not be visible to the socket API. Data may be sent 100 from an application 12 running on top of the TCP block 14 directly to the TCP block 14 via messages. The TCP block 14 may enqueue 102 the data received from the application at the end of the send buffer 22. Based on the sequence number of the next byte of data to be sent, the sequence number of the first byte to be acknowledged, and the size of the data to be sent, the TCP block 14 extracts 104 data to be transmitted. The extracted data may be transmitted 106 to a remote TCP receiver 24, e.g., by the transmit block 16.

Figure 3:
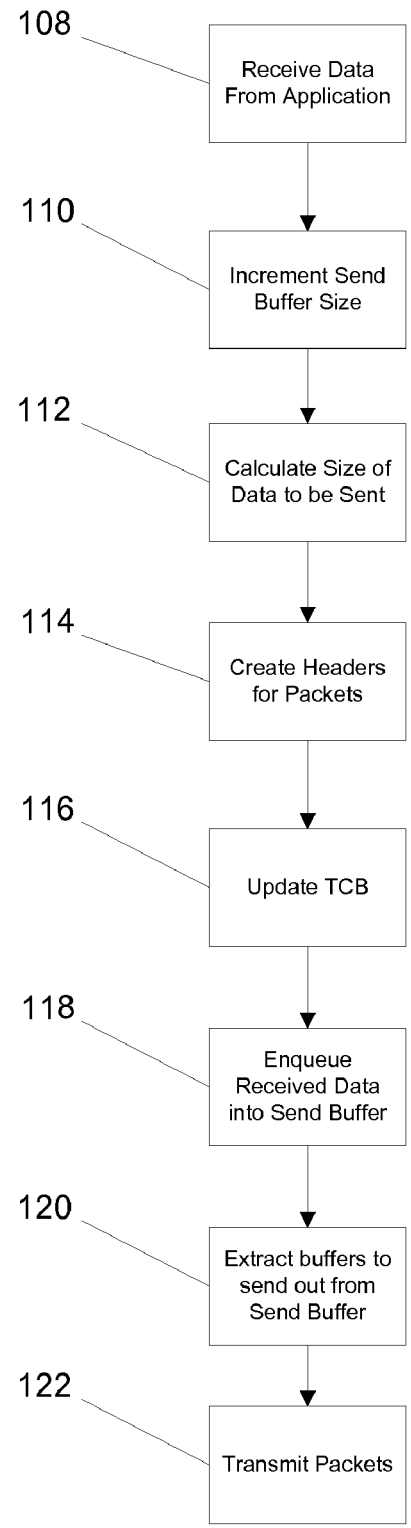
FIG. 3 is a block diagram of TCP block operations.

Turning to FIG. 3, according to an embodiment, the TCP block 14 may maintain a count of the current send buffer size in the TCP control block (TCB) 20. When the TCP block 14 receives 108 data from an application, the TCP block 14 may increment 110 the current send buffer size in the TCB 20 based on the amount of data received. The TCP block 14 may calculate 110 the size of the data to be sent out based on a number of parameters, such as the receiver's window size, congestion window, and the amount of data in the send buffer, etc. Appropriate headers may be created 114 for the packets to be transmitted. The TCP block 14 may update 116 the TCB 20 by writing back the current fields.

Once the TCB 20 has been updated 116, the TCP block may enqueue 118 the data received from the application 12 at the end of the send buffer 22 and extract 120 data from the send buffer 22 to be sent out. By performing the TCB update 116 prior to the enqueue/extract 118/120, the critical section around the read-modify-write of the TCB 20 may be completely independent of the enqueue/extract 118/120.

Table 1 provides pseudo-code for an exemplary design consistent with the present disclosure. As discussed previously, the read-modify-write of the TCB, e.g., update of the TCB 116, is completely separate from the send buffer operations, e.g., enqueue 118 and extraction 120, i.e., dequeue from memory. As these operations are separate from one another, they may be run in parallel, providing more efficient operation. In order to update the TCB 116 the size of the send buffer must be determined 112. Adding the size of the send buffer to the TCB 20 allows the read-modify-write of the TCB 20 to be a completely independent operation.

As also illustrated in the pseudo-code, the costly operation of extracting data from the send buffer may often be avoided as an arbitrary operation. That is, frequently the data received by the TCP block 14, i.e. packet data from the application 12, is the packet to the sent out. If the packet data received from the application 12 are the packets to be sent out, extracting packets from the send buffer 22 prior to transmitting may be avoided. Determining if the packets received from the application 12 are the packets to be sent out may be accomplished by determining if the size of the data to be sent is equal to, or less than, the size of the packet received from the application 12 and determining if the offset of the data to be sent equals the offset of the end of the buffer prior to enqueueing the packets in the send buffer. If both determinations are positive, then the data may be transmitted 122 without the costly extraction, or dequeueing, operation. If the packets received from the application 12, however, are not the packets to be transmitted, the TCP block 14 may execute a conventional extraction operation to extract the appropriate packets to be transmitted, based on the size and the offset of the packets to be sent.

TABLE 1

Exemplary pseudo-code implementation

```
Tcp_output
{
    get in-order packet data from application;
    read tcb;
    tcb->snd_buf_size += size of packet received;
    calculate size of data to be sent out based on tcb;
    calculate offset in snd_buf of the data to be sent out based on tcb;
    modify tcb fields and generate tcp header;
    write back modified tcb;
    // now access send buffer
    Enqueue received packet in send buffer; // simply add it as next buffer to tail
    if ((size of data to send <= size of packet from application) && (offset of data to send ==
offset of end of buffer before enqueue))
    {
        Send out the packet received from application modifying the packet size if
necessary;
    }
    else
    {
        // this is costly operation as it may require traversing the link list
        // however, this is not a common path
        // extraction requires traversing the link list to find the start of
        // data at the correct offset and return back the linked list of buffers
        // starting at the correct offset.
        // There is no copy of data involved in extraction operation.
        Perform extraction of given size and given offset;
        Send out the extracted packet;
    }
}
```

Storing data 118 sent to the TCP block 14 from an application directly into send buffers 22 may allow copying of data buffers to be avoided. Copying of data buffers may also be avoided by sharing the send buffer 22 between the TCP block and the transmit block 16. Packets may be sent out 122 using the same buffers in which the data from the application is stored, i.e., the send buffers 22. The TCP block 14 may own the send buffers 22, and may perform read-modify-write on the send buffer 22. The transmit block 16 may only read from the send buffers 22, but not modify them. Since the transmit block 16 may not modify the send buffers 22, a reference count may be used as a mechanism to allow the transmit block 16 to indicate to the TCP block 14 if the transmit block 16 has finished transmitting packets 122 that were sent to it.

Sharing the send buffer 22 between the TCP block 14 and the transmit block 16 may avoid any copying of either buffer meta data or packet data for segmentation or retransmission. For example, rather than copying the data to provide packets of segmented data with the appropriate headers, headers may be created 114 by the TCP block 14 and saved in a buffer, e.g., a temporary buffer, with links to the data to be sent. The transmit block 16 may read the header data and the data to be sent from the buffers and may transmit packets 122 including the necessary headers and appropriately segmented data using the saved headers and based on the pointers to the data to be sent. Buffers, therefore, may be allocated for the header data, without the need to copy the entirety of the data to be transmitted. The transmit block 16 may walk through the chain of buffers, transmitting packets 122 using the stored headers and the linked send data, until the requested amount of data has been transmitted.

Figure 4:
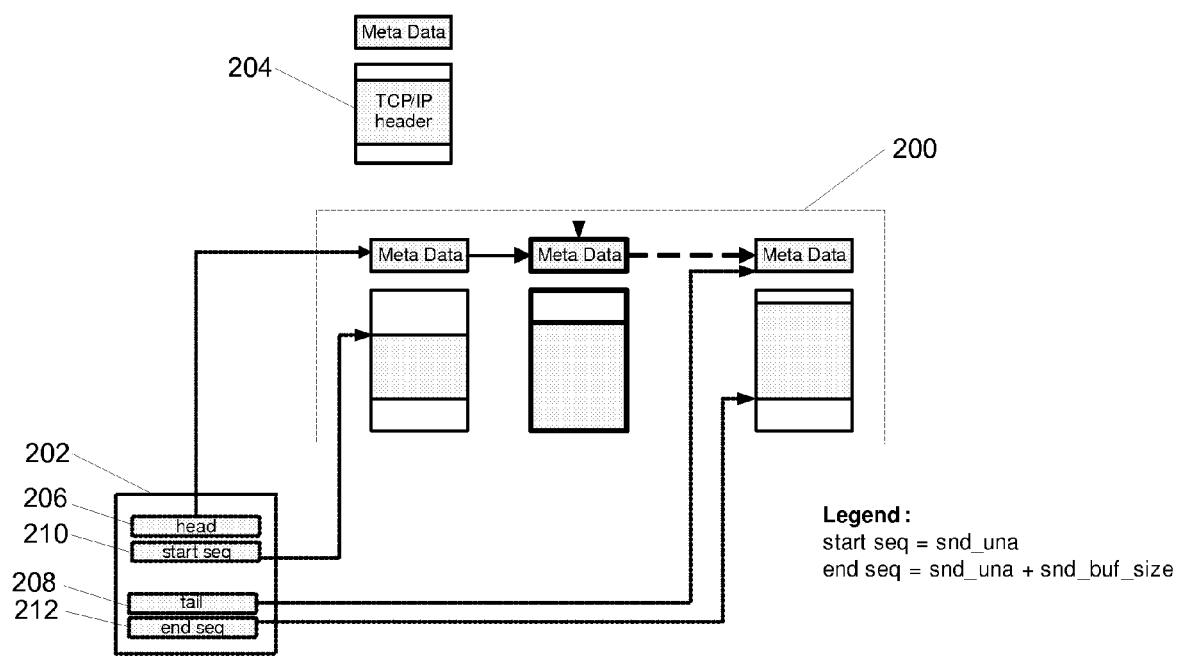
FIG. 4 is an exemplary send buffer organization.

FIG. 4 shows an embodiment of a send buffer organization consistent with the present disclosure. Packets 200 of data for transmission may be created from a block of data stored in the send buffer 202 received from an application. A transmission header 204 may be created for the packets 200 based on the block of data 200 to be transmitted. The 'head' and 'tail' of the series of packets 200 may respectively point to the head 206 and tail 208 of the data buffer chain. Similarly, the 'start seq' 210 and 'end seq' 212 may indicate the sequence space for the send buffer at any given time. In the foregoing buffer organization, for a segment or retransmit data packets 200, it may only be necessary to allocate additional buffer to store the TCP/IP header 204. Then remaining data for the packets 200 may be obtained from the send buffer 202 by linking the header buffer to the send buffer.

Figure 5:
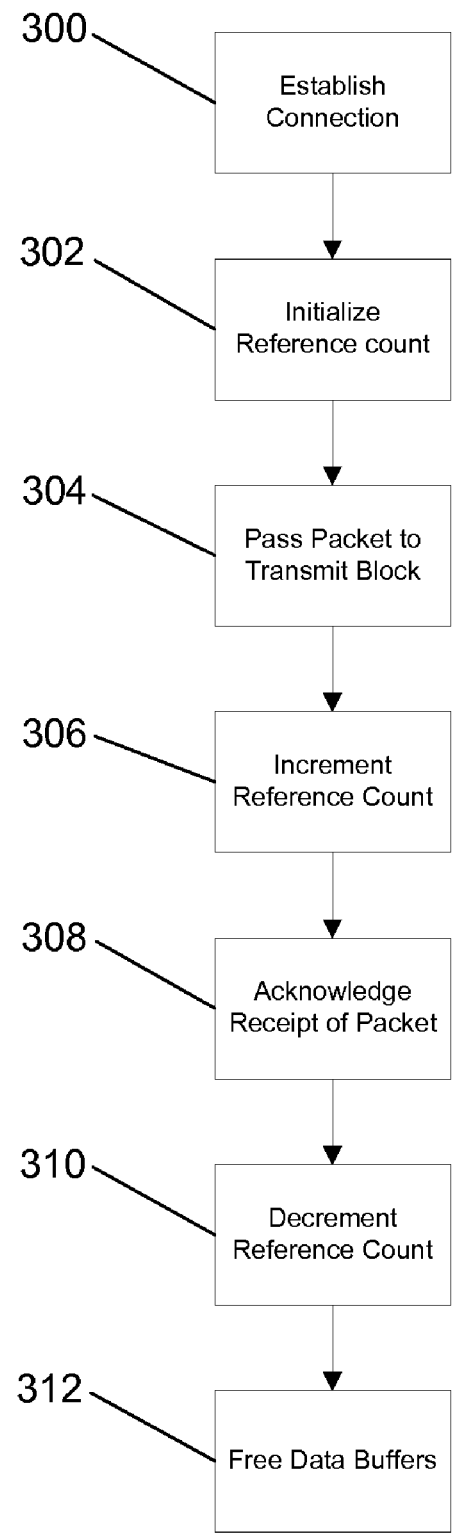
FIG. 5 is a block diagram of an embodiment utilizing a reference count for managing freeing of buffers.

As mentioned above, the transmit block 16 may only read from the send buffers 22, and may not modify the send buffers 22. The reference count may indicate to the TCP block 14 when the transmit block has finished transmitting the packets 122, and may, therefore, be used to control freeing of buffers. With reference also to FIG. 5, a reference count may be maintained for each connection, and the reference count for a connection may be initialized 302 to 1 when the connection is established 300. When a packet is sent, data buffers may be allocated for headers and a pointer to the location for all the packets to be sent out for a given connection may be passed to the transmit block 304. The reference count may be incremented 306 by 1 every time a new packet is passed to the transmit block 304 to be sent. The transmit block 16 may free the header buffer once the packet has been sent 122. However the other buffers, i.e., the buffers including the data to be sent, may be freed by the TCP block 14 based on the reference count, and not by the transmit block 16. For example, the reference count may be decremented 310 by the TCP block 14 in response to an acknowledgement that the data was received 308 by a remote TCP receiver 24. Once all of the data has been acknowledged as received 308, the TCP block 14 may free the data buffers 312 including the sent data.

Initializing the reference 302 count to 1 for each connection may ensure that the transmit block 16 will never have a zero reference count, and will not, therefore, free the data buffers. Freeing the data buffers 312 may be completely under the control of TCP when the transmitted data is acknowledged as received 308. Additionally, because the reference count is initialized 302 at 1, when the value of the reference count is 1, there are no packets that have been sent out from the TCP block 14 to the transmit block 16 but are still waiting to be read by the transmit block 16. Whenever the TCP block 14 needs to free a buffer 312 from the send buffer, e.g., upon receiving an acknowledgement receipt 308, the TCP block 14 waits for the reference count to become 1. A reference count of 1 indicates that all of the packets passed to the transmit block 16 to be sent for a given connection have been acknowledged as received 308 by the receiver. Therefore, when the reference count is 1, the TCP block 14 frees the buffer(s) 312 as it is safe to do so. The reference count may be incremented 306 and decremented 310 by an atomic instruction provided by the CPU. Incrementing 306 and decrementing 310 the reference count using an atomic instruction provided by the CPU may avoid critical sections between TCP block 14 and transmit block 16.

Consistent with various aspects of the present disclosure, a system and method are provided for optimizing buffer usage for transmitting data between applications. Send buffers may be managed by a transmission control protocol block, and may not be visible to the socket API. Additionally, the transmission control protocol block and the transmit block may share the send buffers. Headers, including pointers to the relevant blocks of data, may be created and stored, e.g., in temporary buffers. The transmit block may read the header and the data for transmitting the data without first copying formatted and segmented packets including both header information and the data to be sent. As such, only header buffers need to be allocated. Accordingly, copying of data may be minimized, or eliminated. The transmission control protocol block may have complete control of freeing the buffers, and may use a reference count to determine when all of the data passed to the transmit block has been acknowledged as received by a receiver, indicating that the buffers will not be in use by any other block, and that it is safe to free the buffers.

The preceding embodiments have been described with reference to TCP. However, the advantages and benefits achieved consistent with the foregoing aspects may also be realized in connection with other communication protocols, such as ATM (asynchronous transfer mode), as well as various other communication protocols.

According to an aspect, the present disclosure may provide a method for transmitting data, e.g., between applications. The method may include storing data in a send buffer. The method may further include creating a transmission header including a pointer to the data. The method may further include transmitting packets, in which the packets include the transmission header and the data that is linked to the header by the pointer. The packets may be transmitted without copying the data to create the packets.

According to another aspect, the present disclosure may provide an article including a storage medium having stored thereon instructions that when executed by a machine result in storing data in a send buffer and creating a transmission header including a pointer to the data. The instructions may further result in transmitting packets, in which the packets include the transmission header and the data that is linked to the header by the pointer. The packets may by transmitted without copying the data to create the packets.

According to yet another aspect of the disclosure there may be provided a system including a processor having a circuitry integrated on a die, in which the circuitry may be configured to store data in a send buffer. The circuitry may also be configured to create a transmission header including a pointer to said data, and to transmit packets, in which the packets include the transmission header and the data that is linked to the header by the pointer. The packets may be transmitted without copying the data to create the packets.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents.

What is claimed is:

1. A method comprising:
   storing data in a first buffer;
   creating a transmission header comprising a pointer to said data;
   storing said transmission header in a second buffer; and
   transmitting packets, said packets comprising said transmission header and said data linked to said header by said pointer, by reading said header in said second buffer, locating said data in said first buffer, via said pointer, and transmitting said packet from said first and second buffers, wherein said packets are transmitted without copying said data to a separate buffer.

2. The method of claim 1, further comprising maintaining a current send buffer size and incrementing said current send buffer size based on an amount of said data.

3. The method of claim 2, further comprising calculating a size of the data to be sent based on the current send buffer size and the amount of said data.

4. The method of claim 1, further comprising maintaining a reference count, and incrementing said reference count based on a number of packets to be transmitted.

5. The method of claim 4, further comprising decrementing said reference count based on a number of packets acknowledged as received.

6. The method of claim 5, further comprising freeing said send buffer when said reference count is decremented to a predetermined value.

7. An article comprising a computer readable medium, being a non-transitory signal, encoded with instructions capable of being executed by a computer, that when executed by said computer result in the following operations:
   storing data in a first buffer;
   creating a transmission header comprising a pointer to said data;
   storing said transmission header in a second buffer; and
   transmitting packets, said packets comprising said transmission header and said data linked to said header by said pointer, by reading said header in said second buffer, locating said data in said first buffer, via said pointer, and transmitting said packet from said first and second buffers, wherein said packets are transmitted without copying said data to a separate buffer.

8. The article according to claim 7, wherein, when executed by a machine, the instructions further result in maintaining a current send buffer size and incrementing said current send buffer size based on an amount of said data.

9. The article of claim 8, wherein, when executed by a machine, the instructions further result in calculating a size of the data to be sent based on the current send buffer size and the amount of said data.

10. The article of claim 7, wherein, when executed by a machine, the instructions further result in maintaining a reference count, and incrementing said reference count based on a number of packets to be transmitted.

11. The article of claim 10, wherein, when executed by a machine, the instructions further result in decrementing said reference count based on a number of packets acknowledged as received.

12. The article of claim 11, wherein, when executed by a machine, the instructions further result in freeing said send buffer when said reference count is decremented to a predetermined value.

13. A system comprising a processor having a circuitry integrated on a die, said circuitry configured to:
    store data in a first buffer;
    create a transmission header comprising a pointer to said data;
    store said transmission header in a second buffer; and
    transmit packets, said packets comprising said transmission header and said data linked to said header by said pointer, by reading said header in said second buffer, locating said data in said first buffer, via said pointer, and transmitting said packet from said first and second buffers, wherein said packets are transmitted without copying said data to a separate buffer.

14. The system of claim 13, said circuitry further configured to maintain a current send buffer size and to increment said current send buffer size based on an amount of said data.

15. The system of claim 14, said circuitry further configured to calculate a size of the data to be sent based on the current send buffer size and the amount of said data.

16. The system of claim 13, said circuitry further configured to maintain a reference count, and to increment said reference count based on a number of packets to be transmitted.

17. The system of claim 16, said circuitry further configured to decrement said reference count based on a number of packets acknowledged as received.

18. The system of claim 17, said circuitry further configured to free said send buffer when said reference count is decremented to a predetermined value.

\* \* \* \* \*